United States Patent
Lin

(10) Patent No.: US 10,981,456 B2
(45) Date of Patent: Apr. 20, 2021

(54) ELECTRIC POWER SYSTEM FOR ELECTRIC BUS

(71) Applicant: MOBILETRON ELECTRONICS CO., LTD., Taichung (TW)

(72) Inventor: Meng-Chang Lin, Taichung (TW)

(73) Assignee: MOBILETRON ELECTRONICS, CO., LTD., Taichung (TW)

( * ) Notice: Subject to any disclaimer, the term of this patent is extended or adjusted under 35 U.S.C. 154(b) by 45 days.

(21) Appl. No.: 16/397,753

(22) Filed: Apr. 29, 2019

(65) Prior Publication Data

US 2019/0359071 A1   Nov. 28, 2019

(30) Foreign Application Priority Data

May 23, 2018 (TW) .................................. 107117513

(51) Int. Cl.
| | |
|---|---|
| *B60L 50/60* | (2019.01) |
| *B60L 58/12* | (2019.01) |
| *B60L 58/18* | (2019.01) |
| *H01M 10/42* | (2006.01) |

(52) U.S. Cl.
CPC .............. *B60L 50/66* (2019.02); *B60L 58/12* (2019.02); *B60L 58/18* (2019.02); *H01M 10/425* (2013.01); *H01M 10/4228* (2013.01); *B60L 2200/18* (2013.01); *H01M 2010/4271* (2013.01); *H01M 2220/20* (2013.01)

(58) Field of Classification Search
CPC .......... B60L 50/66; B60L 58/12; B60L 58/18; B60L 2200/18; H01M 10/4228; H01M 10/425; H01M 2/1077; H01M 2/34; H01M 2010/4271; H01M 2200/00; H01M 2220/20; H02J 7/0013
USPC .......... 307/9.1, 10.1; 320/116–117, 122, 127
See application file for complete search history.

(56) References Cited

U.S. PATENT DOCUMENTS

| | | | |
|---|---|---|---|
| 2018/0067167 A1* | 3/2018 | Ide | ......................... H01M 10/48 |
| 2020/0144812 A1* | 5/2020 | Shin | ........................ H01M 2/34 |

* cited by examiner

*Primary Examiner* — Toan T Vu

(74) *Attorney, Agent, or Firm* — Tracy Heims; Apex Juris, Pllc.

(57) ABSTRACT

An electric power system for an electric bus includes a battery assembly, a leakage detection device, and a control device. The battery assembly includes a plurality of series-connected battery packs and a plurality of switch elements, wherein each of the battery packs includes a positive terminal, a negative terminal, and a battery cell module, and the battery packs include a first battery pack and a second battery pack; the positive terminal of the first battery pack and the negative terminal of the second battery pack are electrically connected to a load of the electric bus, and at least one of the positive terminal of the first battery pack and the negative terminal of the second battery pack is electrically connected to the leakage detection device, which outputs a leakage signal when a leakage is detected on an electric wire connected between the battery assembly and the load.

8 Claims, 6 Drawing Sheets ial Field

The present invention is related to an electric power system, and more particularly to an electric power system for an electric bus.

Description of Related Art

With the advancement in knowledge and the effects of global warming, people recognize the environmental impact of carbon emissions, and many governments are active to promote public transportation to reduce carbon emissions.

As comparing to driving cars or riding motorcycles individually, taking conventional buses has lower carbon emissions. However, as comparing to other types of public transportation, the conventional buses are still high-contaminated for requiring a large amount of gasoline or diesel as fuel.

Hence, electric buses are developed to replace the conventional buses. The electric buses utilize battery assemblies as a power supply, and the voltage of the battery assemblies is usually up to hundreds of volts. In addition, the body of the electric bus is made of conductive materials. When a leakage occurs on the electric wires of the aged or damaged battery assemblies, the passengers, drivers or maintenance employees may be injured due to electric shock when they touch the body of the electric bus.

BRIEF SUMMARY OF THE INVENTION

In view of the above, an object of the present invention is to provide an electric power system for an electric bus which could block power supplied from a battery assembly when a leakage occurs.

To achieve the object mentioned above, the present invention provides an electric power system for an electric bus. The electric power system includes a battery assembly, a leakage detection device, and a control device, wherein the battery assembly includes a plurality of series-connected battery packs and a plurality of switch elements. Each of the battery packs includes a positive terminal, a negative terminal, and a battery cell module connected between the positive terminal and the negative terminal; two of the battery cell modules are series-connected via one of the switch elements; each of the switch elements is controllable to conduct or block an electrical connection between every two series-connected battery cell modules; the battery packs include a first battery pack and a second battery pack, wherein the positive terminal of the first battery pack and the negative terminal of the second battery pack are electrically connected to a load of the electric bus; the leakage detection device is electrically connected to at least one of the positive terminal of the first battery pack and the negative terminal of the second battery pack, and is adapted to output a leakage signal when a leakage is detected on an electric wire connected between the positive terminal of the first battery pack or the negative terminal of the second battery pack and the load; the control device is electrically connected to the leakage detection device and the switch elements, and is adapted to control a part of the switch elements to block the electrical connection of the two series-connected battery cell modules after receiving the leakage signal.

The advantage of the present invention is that the electric power system for the electric bus could execute the leakage detection and block the power supply when the leakage occurs, whereby to avoid the risk of electrical disaster of the electric bus due to the leakage of the electric power system. Moreover, through controlling a part of the switch elements to block the electrical connection between the two series-connected battery cell modules, the risk of electrical disaster such as electric arc, which is caused by the immediate drop of the voltage supplied from the battery assembly to the load, could be avoided as well.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
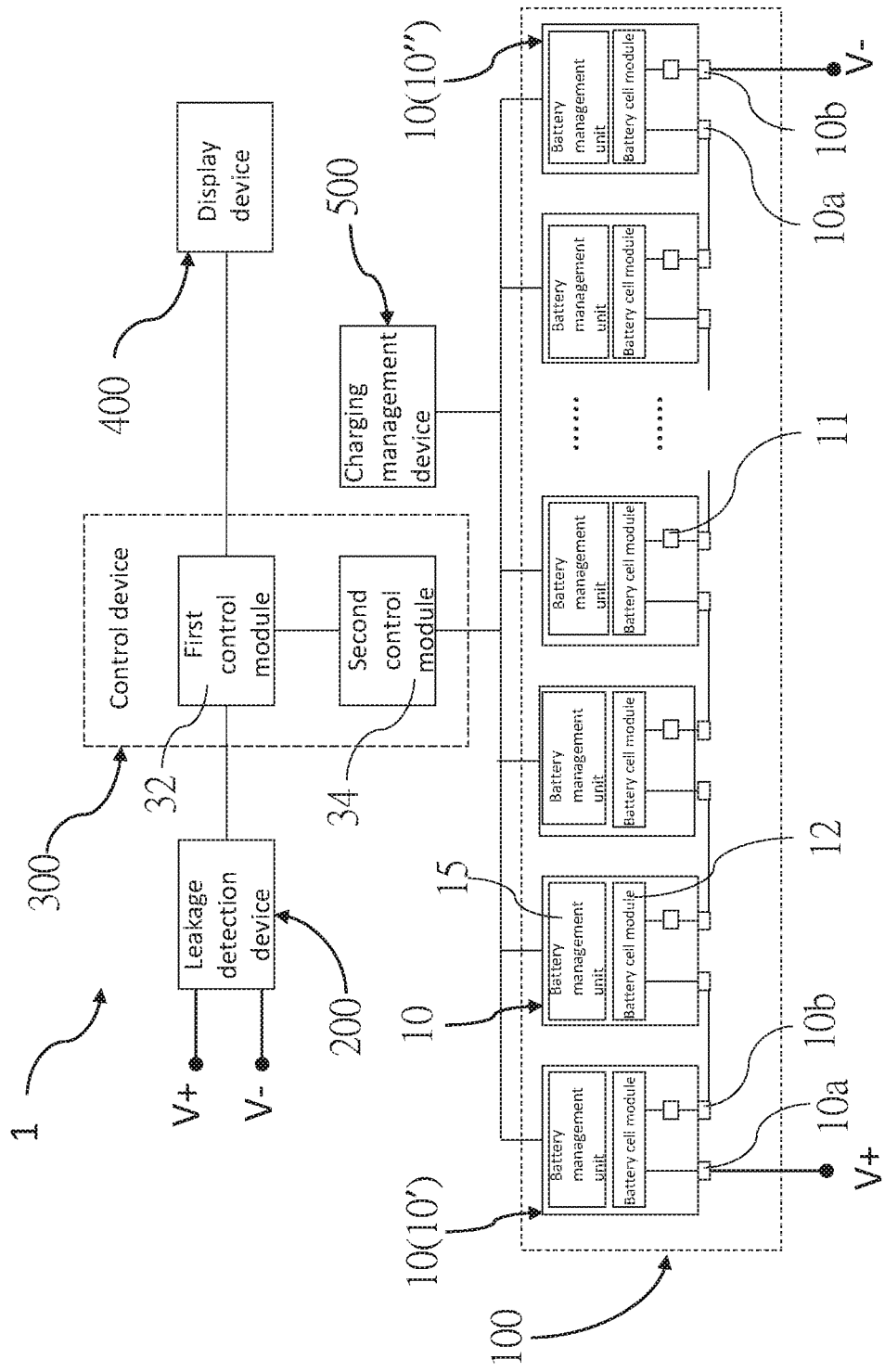
FIG. 1 is a block diagram showing an electrical connection of an electric power system for an electric bus of a first embodiment according to the present invention.

The following illustrative embodiments and drawings are provided to illustrate the disclosure of the present invention, these and other advantages and effects can be clearly understood by persons skilled in the art after reading the disclosure of this specification. Referring to FIG. 1, an electric power system 1 for an electric bus of a first embodiment according to the present invention is illustrated. The electric power system 1 includes a battery assembly 100, a leakage detection device 200, and a control device 300.

Figure 2:
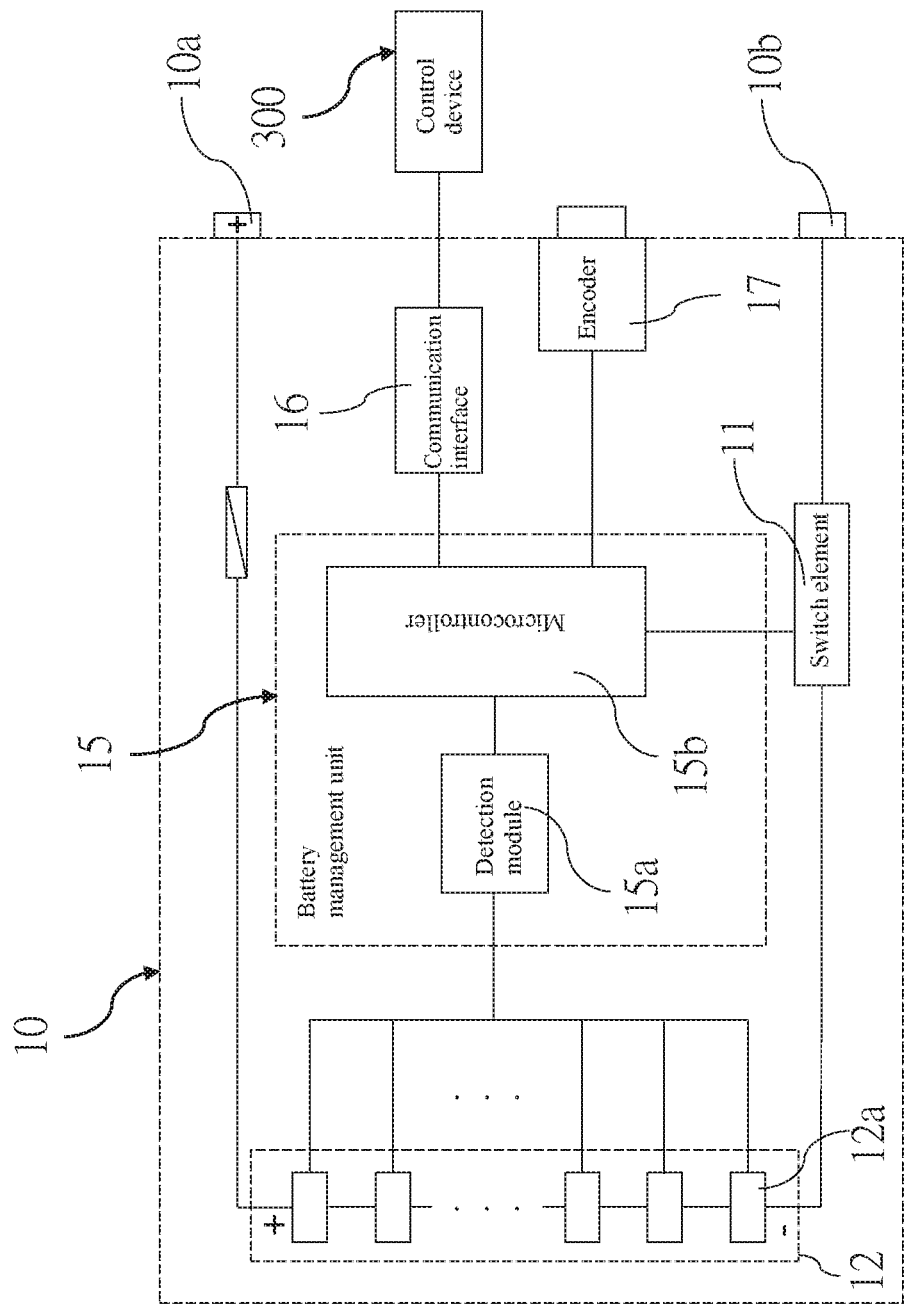
FIG. 2 is a block diagram showing the electrical connection of the battery pack of FIG. 1.

The battery assembly 100 includes a plurality of series-connected battery packs 10 and a plurality of switch elements 11. Referring to FIG. 2, each of the battery packs 10 includes a positive terminal 10*a*, a negative terminal 10*b*, and a battery cell module 12 connected between the positive terminal 10*a* and the negative terminal 10*b*, wherein the battery cell module 12 consists of a plurality of battery cells 12*a*. A first battery pack 10' and a second battery pack 10" of the battery packs 10 are disposed at two opposite ends of the battery assembly 100, and the positive terminal 10*a* of the first battery pack 10' and the negative terminal 10*b* of the second battery pack 10" are electrically connected to a load (not shown) of the electric bus such that the battery assembly 100 could supply power to the load of the electric bus.

In this embodiment, for each of the battery packs 10, the switch element 11 is disposed and electrically connected between a negative electrode of the battery cell module 12 and the negative terminal 10*b* of the battery pack 10 such that the battery cell modules 12 of two adjacent battery packs 10 could be series-connected to each other by utilizing one switch element 11. In addition, the switch element 11 is controllable to conduct or block an electrical connection between every two series-connected battery cell modules 12. In other embodiments, the switch element 11 could be electrically connected between a positive electrode of the battery cell module 12 and the positive terminal 10a of the battery pack 10.

Each of the battery packs 10 further includes a battery management unit 15 and a communication interface 16, wherein the battery management unit 15 includes a detection module 15a and a microcontroller 15b. The detection module 15a is electrically connected to the battery cell module 12 to detect a state of the battery cell module 12, wherein the state detected by the detection module 15a includes at least one of a total voltage and a total current of the battery cell module 12, and a voltage and a temperature of the individual battery cell 12a. The microcontroller 15b is electrically connected to the detection module 15a, an encoder 17, and the switch element 11. In addition, the microcontroller 15b is further electrically connected to a bus via the communication interface 16 to convert a signal output from the microcontroller 15b into a bus signal, such as a CAN-BUS signal. The microcontroller 15b is adapted to generate an identification code according to an encoding configuration of the encoder 17 and output a state signal according to the identification code and the state of the battery cell module 12, wherein the state signal is then converted into a corresponding bus signal via the communication interface 16 to be output. In this embodiment, the encoder 17 includes a knob for a user to manually set one of a plurality of types of the encoding configurations of the encoder 17 to adjust the identification code generated by the microcontroller 15b such that the user could adjust the encoder 17 to a corresponding identification code while replacing the battery pack 10 of the battery assembly 100. In this embodiment, the encoder 17 includes sixteen types of the encoding configurations, which are expressed in a 4-bit binary code, and the corresponding identification code could be 1 to 16.

Moreover, the microcontroller 15b of the battery management unit 15 could further control the switch element 11 to be turned on or off. In the turn-off state, the battery cell module 12 stops supplying power to the positive terminal 10a and the negative terminal 10b so as to cut off the power outputting from the battery pack 10; in the turn-on state, the power of the series-connected battery cell modules 12 could be supplied to the load.

Figure 3:
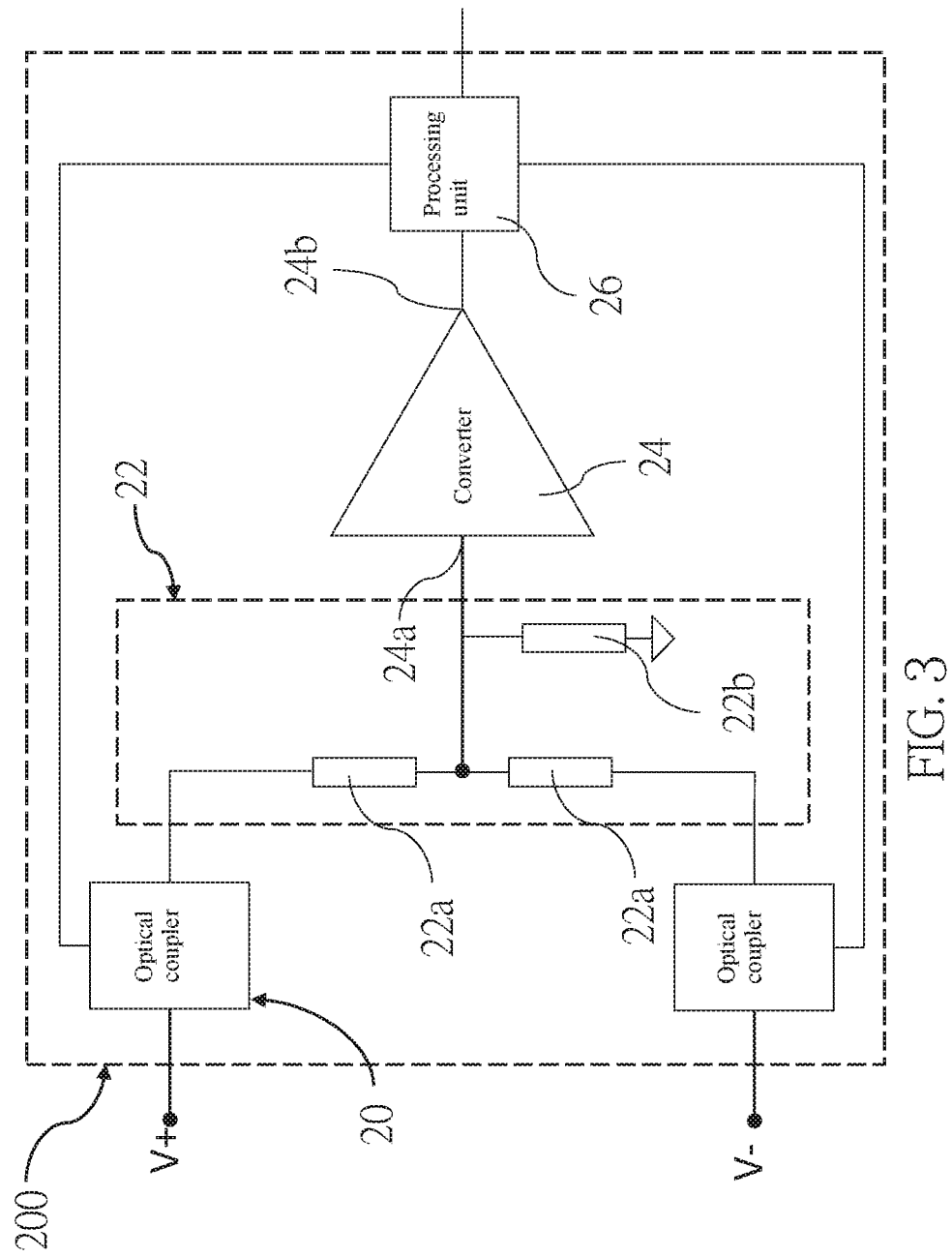
FIG. 3 is a block diagram showing the electrical connection of the leakage detection device of FIG. 1.

Referring to FIG. 3, the leakage detection device 200 is electrically connected to one of the positive terminal 10a of the first battery pack 10' and the negative terminal 10b of the second battery pack 10", and is adapted to output a leakage signal when a leakage is detected on an electric wire between the positive terminal 10a of the first battery pack 10' or the negative terminal 10b of the second battery pack 10" and the load. In this embodiment, the leakage detection device 200 includes two optical couplers 20, a voltage divider 22, a converter 24, and a processing unit 26. In this embodiment, the two optical couplers 20 are electrically connected to the positive terminal 10a of the first battery pack 10' and the negative terminal 10b of the second battery pack 10" respectively, and are adapted to output an electrical signal when the leakage is detected on the electric wire connected between the positive terminal 10a of the first battery pack 10' or the negative terminal 10b of the second battery pack 10" and the load.

In this embodiment, the two optical couplers 20 are respectively controlled by the processing unit 26 to operate. When one of the optical couplers 20 is actuated, another one of the optical couplers 20 would be idle. Whereby, it is favorable to detect the leakage at the positive terminal 10a of the first battery pack 10' or the negative terminal 10b of the second battery pack 10" respectively. The processing unit 26 could control the two optical couplers 20 to stop operation when it is not required to detect the leakage.

The voltage divider 22 is electrically connected between the optical couplers 20 and the converter 24, and is adapted to receive the electrical signal output from the optical couplers 20 and to divide the electrical signal. In this embodiment, the voltage divider 22 includes two first resistors 22a and a second resistor 22b, and the converter 24 includes an input terminal 24a and an output terminal 24b, wherein one end of each of the two first resistors 22a is electrically connected to the second resistor 22b and the input terminal 24a of the converter 24, and another end of each of the two first resistors 22a is electrically connected to one optical coupler 20 respectively; another end of the second resistor 22b is electrically connected to a common terminal. The output terminal 24b of the converter 24 is electrically connected to the processing unit 26, and the converter 24 is adapted to convert the divided electrical signal into a digital signal and transmit the digital signal to the processing unit 26. In this embodiment, the processing unit 26 compares a digital value, which is corresponding to the received digital signal, with a reference value, and outputs the leakage signal when a difference value between the digital value and the reference value is larger than a predetermined difference value.

In other embodiments, the leakage detection device 200 could include only one optical coupler 20 which could be electrically connected to the positive terminal 10a of the first battery pack 10' or the negative terminal 10b of the second battery pack 10"; the voltage divider 22 could include only one first resistor 22a.

The control device 300 includes a first control module 32 and a second control module 34, wherein the first control module 32 is electrically connected to the leakage detection device 200 to receive the leakage signal, and the second control module 34 is electrically connected to the microcontroller 15b and the switch element 11 of each of the battery packs 10. In this embodiment, one end of the second control module 34 is electrically connected to the microcontroller 15b of the battery management unit 15 of each of the battery packs 10 via the bus. The end of the second control module 34 is electrically connected to the switch element 11 via the microcontroller 15b, wherein the second control module 34 is stored with the identification codes of all battery packs 10 and is adapted to divide the identification codes into a plurality of groups. The groups include a first group and a second group. One battery pack 10 with the identification code of the first group is series-connected between two battery packs 10 with the identification codes of the second group. For example, when the series-connected battery packs have the identification codes of 1 to 16 in order, the identification codes having even numbers could be defined as the first group, and the identification codes having odd numbers could be defined as the second group. In other embodiments, the identification codes could further be divided into more than two groups.

Figure 4:
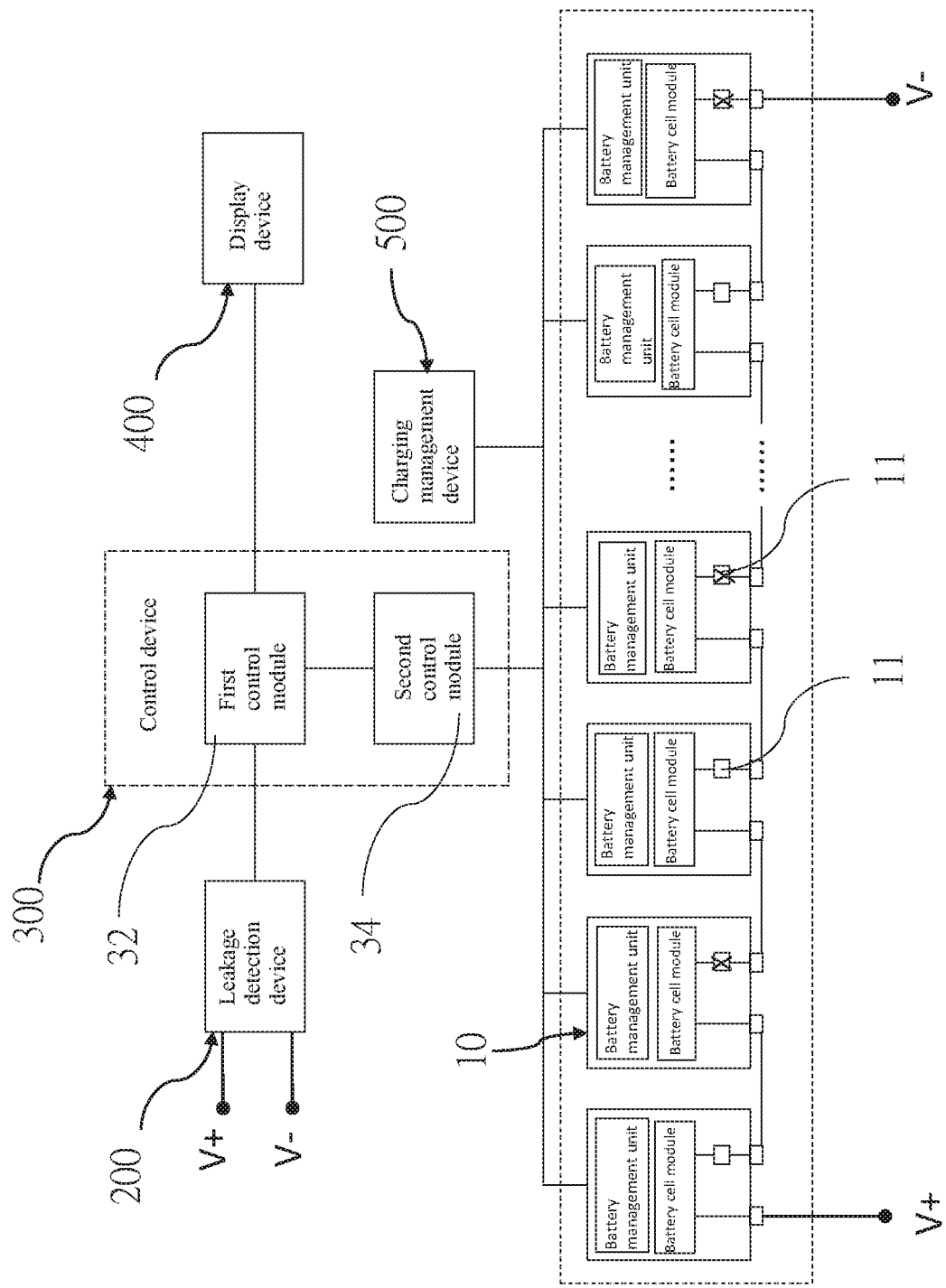
FIG. 4 is a block diagram showing that the electric power system for the electric bus of FIG. 1 is blocked.
Figure 5:
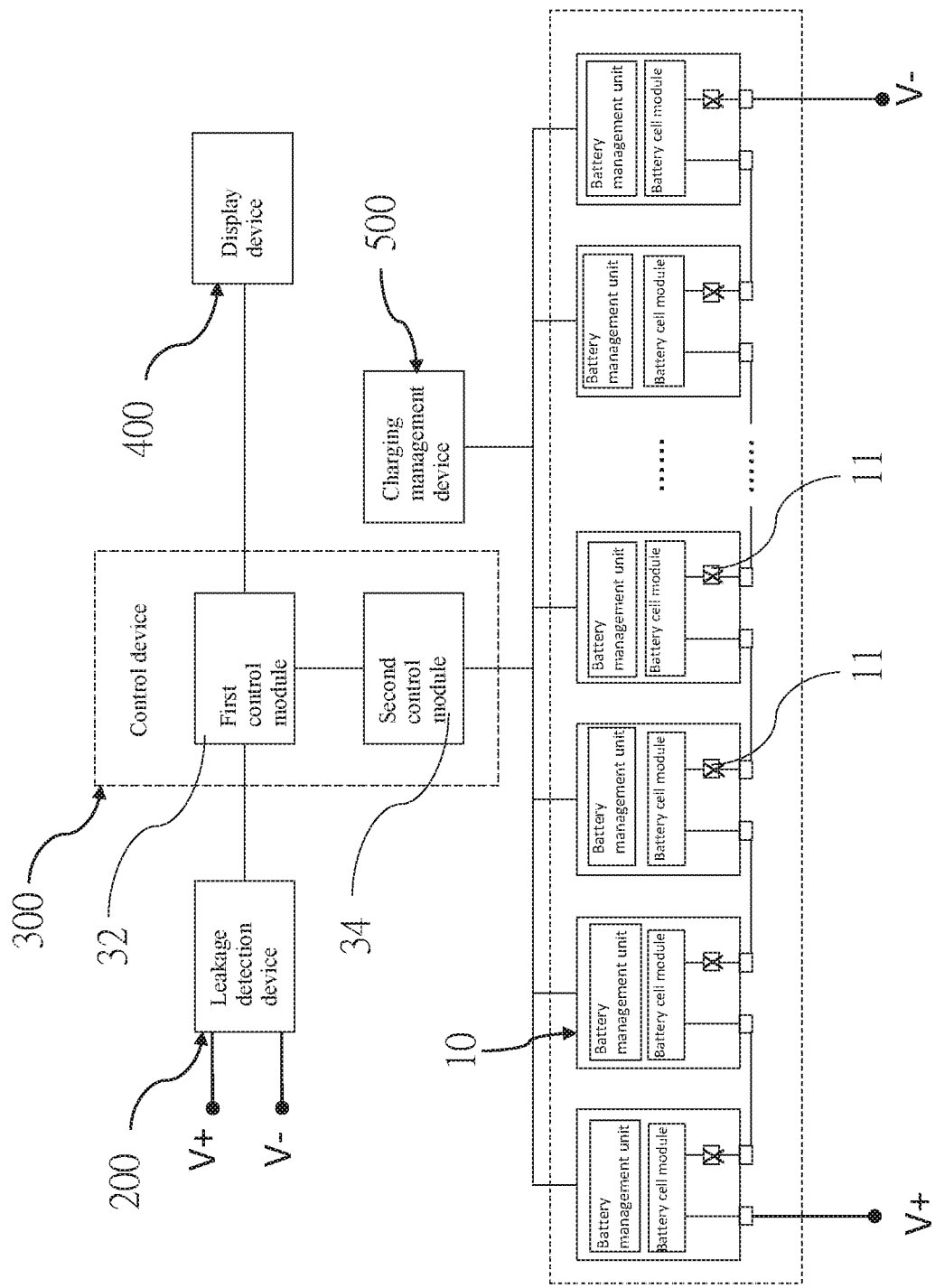
FIG. 5 is a block diagram showing that the electric power system for the electric bus of FIG. 1 is blocked.

Referring to FIG. 4 and FIG. 5, when the control device 300 receives the leakage signal, the control device 300 would output a first blocking signal to the microcontrollers 15b with the identification codes of the first group so as to enable the microcontrollers 15b to control the corresponding switch elements 11 to block the electrical connection between the two series-connected battery cell modules 12. In this way, the power supplied from the battery packs 10 could be blocked. In this embodiment, after outputting the first blocking signal, the control device 300 would further output a second blocking signal to the microcontrollers 15b with the identification codes of the second group to control the corresponding switch elements 11 to block the electrical connection between the two series-connected battery cell modules 12. In order to reduce a total voltage of the series-connected battery packs 10 and to avoid a danger of leakage, only a part of the series-connected battery cell modules 12 are blocked at the first time such that a risk of electrical disaster such as electric arc, which is caused by an immediate drop of the voltage supplied from the battery assembly 100 to the load when all the battery packs 10 are blocked at one time, could be reduced as well. The other series-connected battery cell modules 12 are then blocked at the second time to avoid a risk that a total voltage of the two series-connected battery cell modules 12 is still too high, which may result in electric shock. Hence, the battery cell modules 12 would not be electrically connected to each other after being blocked at the second time.

Whereby, the electric power system 1 for the electric bus could execute a leakage detection via the leakage detection device 200, and the leakage detection device 200 would output the leakage signal when the leakage is detected. After receiving the leakage signal, the control device 300 would control a part of the switch elements 11 to block the electrical connection. In practice, the control device 300 could also be directly, electrically connected to the switch element 11 so as to directly control the switch element 11.

Moreover, the electric power system 1 further includes a display device 400 and a charging management device 500, wherein the display device 400 is electrically connected to the control device 300 and is adapted to provide information of the electric power system 1 for the user. The charging management device 500 is adapted to manage a charging state of each of the battery packs 10. In this embodiment, the charging state of each of the battery packs 10 could be displayed via the display device 400, and the user could check whether the battery pack 10 is damaged and could replace the damaged battery pack 10. In other embodiments, the electric power system 1 could be not provided with the display device 400 and the charging management device 500.

Figure 6:
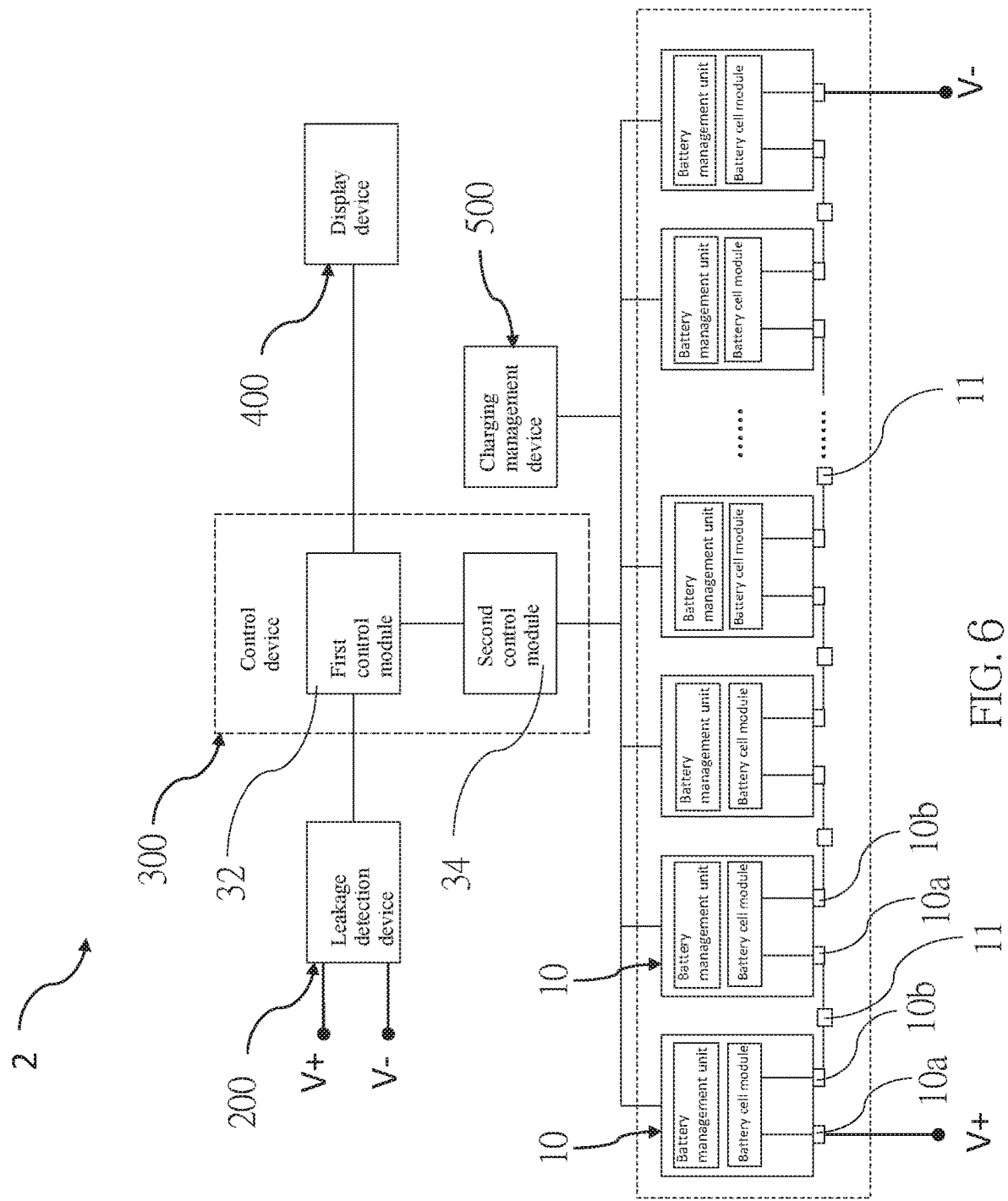
FIG. 6 is a block diagram showing an electrical connection of an electric power system for an electric bus of a second embodiment according to the present invention.

Referring to FIG. 6, an electric power system 2 for an electric bus of a second embodiment according to the present invention has almost the same structure as the electric power system 1 for the electric bus of the first embodiment, except that the switch element 11 is electrically connected between the positive terminal 10a of one battery pack 10 and the negative terminal 10b of another battery pack 10. In this embodiment, the switch element 11 would be controlled in a way identical to the first embodiment when the leakage is detected and the detail description is omitted here.

According to the illustration mentioned above, the electric power system 1 for the electric bus of the present invention could execute the leakage detection and block the power supply when the leakage occurs, whereby to avoid the risk of electrical disaster of the electric bus due to the leakage of the electric power system. Moreover, through controlling a part of the switch elements 11 to block the electrical connection between the two series-connected battery cell modules 12, the risk of electrical disaster such as electric arc, which is caused by the immediate drop of the voltage supplied from the battery assembly 100 to the load, could be avoided as well.

It must be pointed out that the embodiments described above are only some embodiments of the present invention. All equivalent structures which employ the concepts disclosed in this specification and the appended claims should fall within the scope of the present invention.

What is claimed is:

1. An electric power system for an electric bus, comprising:
   a battery assembly, including a plurality of series-connected battery packs and a plurality of switch elements, wherein each of the battery packs includes a positive terminal, a negative terminal, and a battery cell module connected between the positive terminal and the negative terminal; two of the battery cell modules are series-connected via one of the switch elements; each of the switch elements is controllable to conduct or block an electrical connection between the every two series-connected battery cell modules; and the battery packs include a first battery pack and a second battery pack, wherein the positive terminal of the first battery pack and the negative terminal of the second battery pack are electrically connected to a load of the electric bus;
   a leakage detection device, being electrically connected to at least one of the positive terminal of the first battery pack and the negative terminal of the second battery pack, and adapted to output a leakage signal when a leakage is detected on an electric wire connected between the at least one of the positive terminal of the first battery pack and the negative terminal of the second battery pack and the load; and
   a control device, being electrically connected to the leakage detection device and the switch elements, and adapted to control a part of the switch elements to block the electrical connection of the two series-connected battery cell modules after receiving the leakage signal;
   wherein the leakage detection device includes at least one optical coupler, a voltage divider, a converter, and a processing unit; the at least one optical coupler is electrically connected to at least one of the positive terminal of the first battery pack and the negative terminal of the second battery pack, and is adapted to output the leakage signal when the leakage is detected on the electric wire connected between the positive terminal of the first battery pack or the negative terminal of the second battery pack and the load; the voltage divider is electrically connected between the at least one optical coupler and the converter, and is adapted to divide the leakage signal and output the divided leakage signal to the converter; the converter is adapted to convert the divided leakage signal into a digital signal; the processing unit is electrically connected to the converter; the processing unit is adapted to compare a digital value corresponding to the received digital signal with a reference value and output the leakage signal when a difference value between the digital value and the reference value is larger than a predetermined difference value.

2. The electric power system for the electric bus of claim 1, wherein the voltage divider includes at least one first resistor and a second resistor; one end of the at least one first resistor is electrically connected to the second resistor and the converter, and another end of the at least one first resistor is electrically connected to the at least one optical coupler.

3. An electric power system for an electric bus, comprising:

a battery assembly, including a plurality of series-connected battery packs and a plurality of switch elements, wherein each of the battery packs includes a positive terminal, a negative terminal, and a battery cell module connected between the positive terminal and the negative terminal; two of the battery cell modules are series-connected via one of the switch elements; each of the switch elements is controllable to conduct or block an electrical connection between the every two series-connected battery cell modules; and the battery packs include a first battery pack and a second battery pack, wherein the positive terminal of the first battery pack and the negative terminal of the second battery pack are electrically connected to a load of the electric bus;

a leakage detection device, being electrically connected to at least one of the positive terminal of the first battery pack and the negative terminal of the second battery pack, and adapted to output a leakage signal when a leakage is detected on an electric wire connected between the at least one of the positive terminal of the first battery pack and the negative terminal of the second battery pack and the load; and a control device, being electrically connected to the leakage detection device and the switch elements, and adapted to control a part of the switch elements to block the electrical connection of the two series-connected battery cell modules after receiving the leakage signal, wherein each of the battery packs further includes a microcontroller; each of the microcontrollers generates an identification code and is electrically connected to each of the switch elements and the control device; the control device is stored with the identification codes and is adapted to output a first blocking signal to the microcontrollers with the identification codes of a first group after receiving the leakage signal so as to block the electrical connection between the two series-connected battery cell modules via the switch elements which are controlled by the microcontrollers receiving the first blocking signal.

4. The electric power system for the electric bus of claim 3, wherein the control device is further adapted to output a second blocking signal to the microcontrollers with the identification codes of a second group to block the electrical connection between the two series-connected battery cell modules via the switch elements which are controlled by the microcontrollers receiving the second blocking signal.

5. The electric power system for the electric bus of claim 4, wherein one battery pack with the identification code of the first group is series-connected between two battery packs with the identification codes of the second group; the control device outputs the first blocking signal to the microcontrollers with the identification codes of the first group, and then outputs the second blocking signal to the microcontrollers with the identification codes of the second group.

6. The electric power system for the electric bus of claim 3, wherein the control device includes a first control module and a second control module; the first control module is electrically connected to the leakage detection device to receive the leakage signal; the second control module is electrically connected to the microcontroller of each of the battery packs to output the first blocking signal.

7. The electric power system for the electric bus of claim 3, wherein each of the switch elements is electrically connected between the positive terminal of one battery pack and the negative terminal of another battery pack.

8. The electric power system for the electric bus of claim 3, wherein each of the switch elements is electrically connected between the battery cell module and the negative terminal or the positive terminal of each of the battery packs.

* * * * *